(12) United States Patent
Tseng et al.

(10) Patent No.: US 11,601,003 B2
(45) Date of Patent: Mar. 7, 2023

(54) UNIVERSAL WIRELESS CHARGING RECEIVER

(71) Applicant: Primax Electronics Ltd., Taipei (TW)

(72) Inventors: Chia-Hsiang Tseng, Taipei (TW); Ling-Sheng Zeng, Taipei (TW); Chao Pang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 160 days.

(21) Appl. No.: 17/108,903

(22) Filed: Dec. 1, 2020

(65) Prior Publication Data

US 2022/0131403 A1  Apr. 28, 2022

(30) Foreign Application Priority Data

Oct. 28, 2020  (CN) .......................... 202011171123.3

(51) Int. Cl.
*H02J 50/00* (2016.01)
*H02J 7/02* (2016.01)
*H02J 50/70* (2016.01)
*H02J 50/10* (2016.01)

(52) U.S. Cl.
CPC .............. *H02J 7/02* (2013.01); *H02J 50/005* (2020.01); *H02J 50/10* (2016.02); *H02J 50/70* (2016.02)

(58) Field of Classification Search
CPC ........................................................ H02J 5/005
USPC ........................................................ 320/108
See application file for complete search history.

(56) References Cited

U.S. PATENT DOCUMENTS

| | | | |
|---|---|---|---|
| 2011/0062793 A1* | 3/2011 | Azancot | H02J 50/12 307/116 |
| 2015/0290373 A1* | 10/2015 | Rudser | A61M 60/50 623/3.27 |
| 2021/0343470 A1* | 11/2021 | Los | H01F 27/2823 |
| 2022/0045398 A1* | 2/2022 | Havskjold | H01M 50/284 |

* cited by examiner

*Primary Examiner* — Edward Tso
*Assistant Examiner* — Ahmed H Omar
(74) *Attorney, Agent, or Firm* — Kirton McConkie; Evan R. Witt

(57) ABSTRACT

A universal wireless charging receiver for an electronic device is provided. The universal wireless charging receiver includes a base casing, a first magnetic shielding element, a power supply module and an induction coil. The first magnetic shielding element, the power supply module and the induction coil are installed in the base casing. The power supply module is located over the first magnetic shielding element. A magnetic field is shielded by the first magnetic shielding element. Consequently, an eddy current is not generated by the power supply module through the magnetic field.

8 Claims, 7 Drawing Sheets

UNIVERSAL WIRELESS CHARGING RECEIVER

FIELD OF THE INVENTION

The present invention relates to a charging receiver, and more particularly to a wireless charging receiver for an electronic device.

BACKGROUND OF THE INVENTION

In modern societies, portable electronic devices become indispensable parts in human lives. The electronic devices are applied in many sectors, including food, clothing, housing, transportation, education and entertainment. Generally, most of the portable electronic devices are powered by their built-in batteries. After the electrical quantity of the battery is used up, the user has to charge the battery of the electronic device. Consequently, the electronic device can be operated continuously.

Generally, the battery can be charged according to a wired charging technology or a wireless charging technology. According to the wireless charging technology, an induction coil is installed in the electronic device and electrically connected with the built-in battery of the electronic device. During operation, the electronic device is placed on a wireless charging dock, and a transmitter coil within the wireless charging dock generates a magnetic field. After the magnetic field is induced by the induction coil, a current is generated according to the change of the magnetic flux.

However, since some of the portable electronic devices are not equipped with the built-in wireless charging modules, these portable electronic devices cannot be wirelessly charged. For solving the above drawbacks, there is a need of providing a universal wireless charging receiver that can be applied to or installed in various electronic devices.

SUMMARY OF THE INVENTION

The present invention provides a universal wireless charging receiver that can be applied to or installed in various electronic devices.

In accordance with an aspect of the present invention, a universal wireless charging receiver for an electronic device is provided. The universal wireless charging receiver includes a base casing, a first magnetic shielding element, a power supply module and an induction coil. The base casing includes a recess and a concave structure. The concave structure is arranged around the recess. The first magnetic shielding element is disposed within the recess. The power supply module is located over the first magnetic shielding element. The power supply module is connected with the electronic device to provide electricity to the electronic device. The induction coil is disposed within the concave structure, and electrically connected with the power supply module. A magnetic field is shielded by the first magnetic shielding element. Consequently, an eddy current is not generated by the power supply module through the magnetic field.

In an embodiment, the base casing further includes a ring-shaped wall between the recess and the concave structure, the concave structure has at least one wire groove, and the ring-shaped wall has at least one notch corresponding to the at least one wire groove.

In an embodiment, the induction coil includes a first connection terminal and a second connection terminal. The first connection terminal and the second connection terminal are disposed within the at least one wire groove. The first connection terminal and the second connection terminal are penetrated through the at least one notch so as to be electrically connected with the power supply module.

In an embodiment, the base casing further includes a protrusion edge. The protrusion edge is arranged around the concave structure and has a stepped structure. A bottom end of the protrusion edge is at a same level with a top end of the ring-shaped wall.

In an embodiment, the universal wireless charging receiver further includes a second magnetic shielding element, and the second magnetic shielding element has a hollow portion corresponding to the power supply module. A bottom surface of the second magnetic shielding element is contacted with the bottom end of the protrusion edge and the top end of the ring-shaped wall. The induction coil is covered by the second magnetic shielding element. A top surface of the power supply module is exposed to the hollow portion of the second magnetic shielding element.

In an embodiment, the power supply module includes a rectifier circuit board, a first electrode and a second electrode. The first electrode and the second electrode are electrically connected with the rectifier circuit board. The first electrode and the second electrode are disposed on a top surface of the rectifier circuit board and connected with the electronic device.

In an embodiment, the power supply module includes a disc-shaped support structure, a first electrode and a ring-shaped second electrode. The disc-shaped support structure includes a first perforation and a ring-shaped trench. The first perforation runs through a middle region of the disc-shaped support structure. The ring-shaped trench is arranged around the first perforation. At least one second perforation is formed in a bottom of the ring-shaped trench. The first electrode is disposed within the first perforation. The second electrode is disposed within the ring-shaped trench.

In an embodiment, a distal end of the first connection terminal is bent toward the first perforation and contacted with the first electrode. Moreover, a distal end of the second connection terminal is bent toward the second perforation, penetrated through the second perforation and contacted with the second electrode.

When compared with the conventional technologies, the volume of the universal wireless charging receiver of the present invention is reduced. When the universal wireless charging receiver is mounted or installed on the electronic device, the flexibility is enhanced. Moreover, since the power supply module can be connected with various kinds of electronic devices, the applications are expanded. Moreover, the use of the magnetic shielding element can increase the use life and the energy transfer efficiency of the universal wireless charging receiver.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
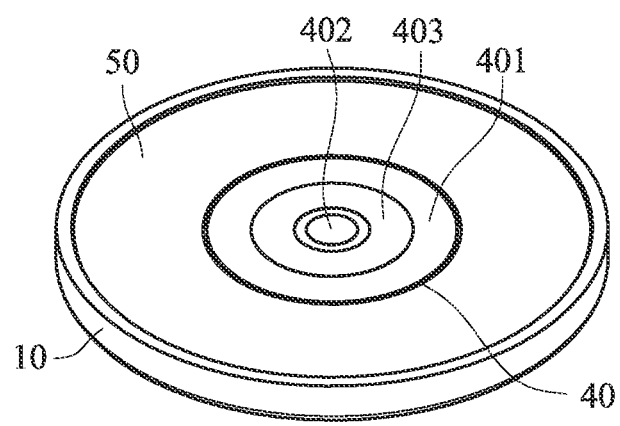
FIG. 1A is a schematic perspective view illustrating a universal wireless charging receiver according to a first embodiment of the present invention.
Figure 1B:
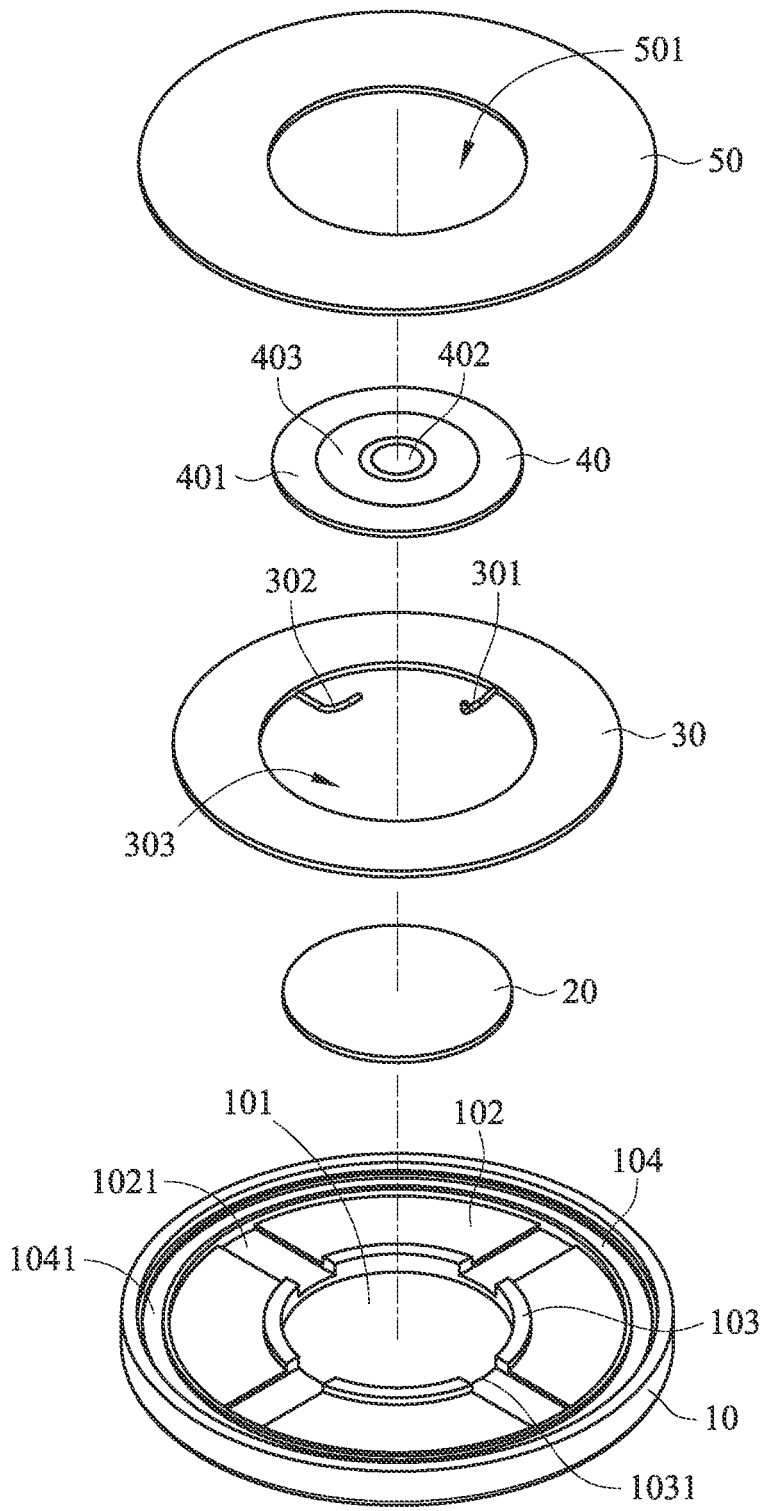
FIG. 1B is a schematic exploded view illustrating the universal wireless charging receiver according to the first embodiment of the present invention.

Please refer to FIGS. 1A and 1B. FIG. 1A is a schematic perspective view illustrating a universal wireless charging receiver according to a first embodiment of the present invention. FIG. 1B is a schematic exploded view illustrating the universal wireless charging receiver according to the first embodiment of the present invention. The universal wireless charging receiver 1 comprises a base casing 10, a first magnetic shielding element 20, an induction coil 30, a power supply module 40 and a second magnetic shielding element 50.

The base casing 10 comprises a recess 101 and a concave structure 102. The concave structure 102 is arranged around the recess 101. In this embodiment, the base casing 10 has a circular profile. Moreover, plural wire grooves 1021 are formed in a bottom of the concave structure 102 along a radial direction. The base casing 10 further comprises a ring-shaped wall 103 between the recess 101 and the concave structure 102. The ring-shaped wall 103 has plural notches 1031 corresponding to the plural wire grooves 1021, respectively. The base casing 10 further comprises a protrusion edge 104. The protrusion edge 104 is arranged around the concave structure 102 and has a stepped structure. The bottom end of the protrusion edge 104 is at the same level with the top end of the ring-shaped wall 103. In an embodiment, a ring-shaped accommodation groove 1041 is formed in the bottom end of the protrusion edge 104. A magnetic element (not shown) may be accommodated within the ring-shaped accommodation groove 1041. Due to the magnetic element, the universal wireless charging receiver 1 can be fixed on a shell surface of the electronic device in a magnetically attractable manner. In this embodiment, the base casing 10 has a circular profile. It is noted that the profile of the base casing 10 is not restricted. For example, the base casing 10 may have a disc profile, a rectangular profile, a triangular profile or a polygonal profile.

The first magnetic shielding element 20 is made of an unmagnetized material such as ferrite. The profile of the first magnetic shielding element 20 matches the profile of the recess 101. For example, the first magnetic shielding element 20 has a disc profile.

The induction coil 30 comprises a first connection terminal 301 and a second connection terminal 302. The first connection terminal 301 and the second connection terminal 302 are arranged along the radial direction. The distal ends of the first connection terminal 301 and the second connection terminal 302 are disposed within a center opening 303 of the induction coil 30.

The power supply module 40 comprises a rectifier circuit board 401, a first electrode 402 and a second electrode 403. The first electrode 402 and the second electrode 403 are both disposed on a top surface of the rectifier circuit board 401. The second electrode 403 is located outside the first electrode 402 and arranged around the first electrode 402.

The second magnetic shielding element 50 is made of an unmagnetized material such as ferrite. The profile of the second magnetic shielding element 50 matches the profile of the concave structure 102. For example, the second magnetic shielding element 50 has a disc profile. Moreover, the second magnetic shielding element 50 has a hollow portion 501 corresponding to the power supply module 40.

Figure 2:
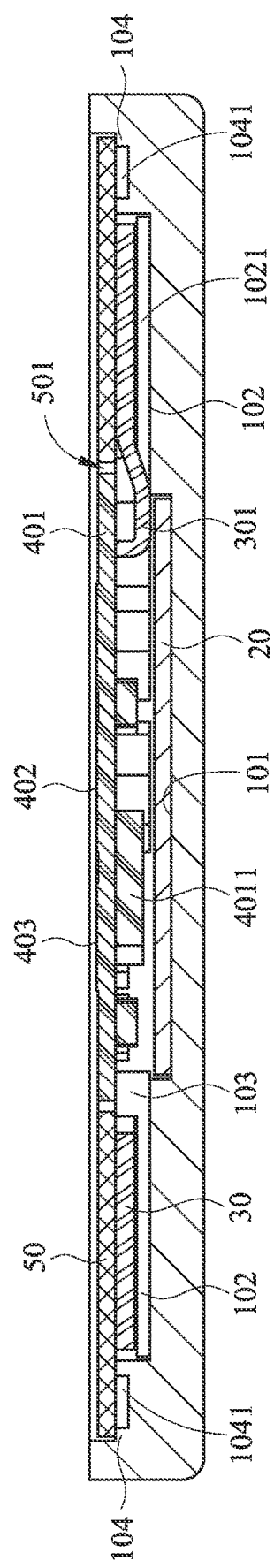
FIG. 2 is a schematic cross-sectional view illustrating the universal wireless charging receiver according to the first embodiment of the present invention.

Please refer to FIGS. 1B and 2. FIG. 2 is a schematic cross-sectional view illustrating the universal wireless charging receiver according to the first embodiment of the present invention. As shown in FIG. 2, the first magnetic shielding element 20 is disposed within the recess 101, and the power supply module 40 is located over the first magnetic shielding element 20. Moreover, a portion of the outer periphery of the bottom surface of the rectifier circuit board 401 is contacted and connected with the top end of the ring-shaped wall 103. Consequently, an accommodation space is formed between the rectifier circuit board 401 and the first magnetic shielding element 20. The electronic components on the bottom surface of the rectifier circuit board 401 can be accommodated within the accommodation space. The induction coil 30 is sheathed around the ring-shaped wall 103 through the opening 303. In addition, the induction coil 30 is disposed within the concave structure 102. After the induction coil 30 is placed within the concave structure 102, the first connection terminal 301 and the second connection terminal 302 of the induction coil 30 are disposed within the corresponding wire grooves 1021 of the concave structure 102. In addition, the distal ends of the first connection terminal 301 and the second connection terminal 302 are penetrated through the corresponding notches 1031 and bent toward the rectifier circuit board 401. Consequently, the first connection terminal 301 and the second connection terminal 302 are electrically connected with the rectifier circuit board 401. The bottom surface of the second magnetic shielding element 50 is contacted and connected with the bottom end of the protrusion edge 104 and the top end of the ring-shaped wall 103. Consequently, the second magnetic shielding element 50 is located over the induction coil 30 to cover the induction coil 30. The top surface of the power supply module 40 is exposed to the hollow portion 501 of the second magnetic shielding element 50. Consequently, the first electrode 402 and the second electrode 403 on the top surface of the rectifier circuit board 401 can be electrically connected with the electronic device to provide electricity to the electronic device. When the induction coil 30 receives a magnetic field, the induction coil 30 generates an alternating current through an electromagnetic induction effect. The alternating current flows through the induction coil 30 and transfers to the rectifier circuit board 401 through the first connection terminal 301 and the second connection terminal 302. Then, the alternating current is converted into a direct current by the rectifier circuit board 401. The direct current is transferred to the electronic device through the first electrode 402 and the second electrode 403.

Figure 3A:
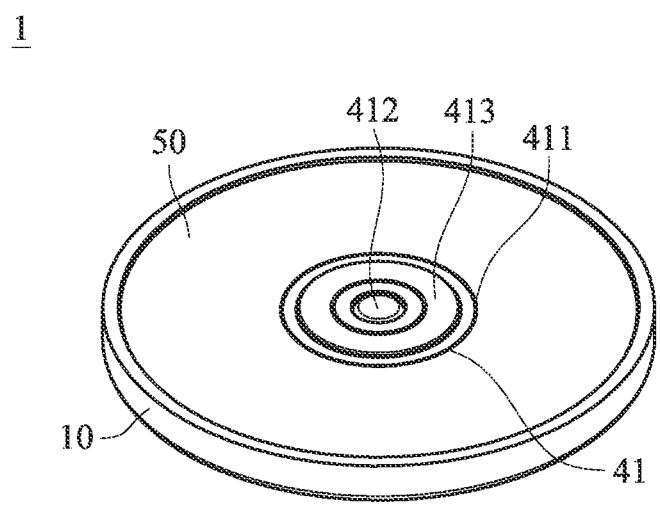
FIG. 3A is a schematic perspective view illustrating a universal wireless charging receiver according to a second embodiment of the present invention.
Figure 3B:
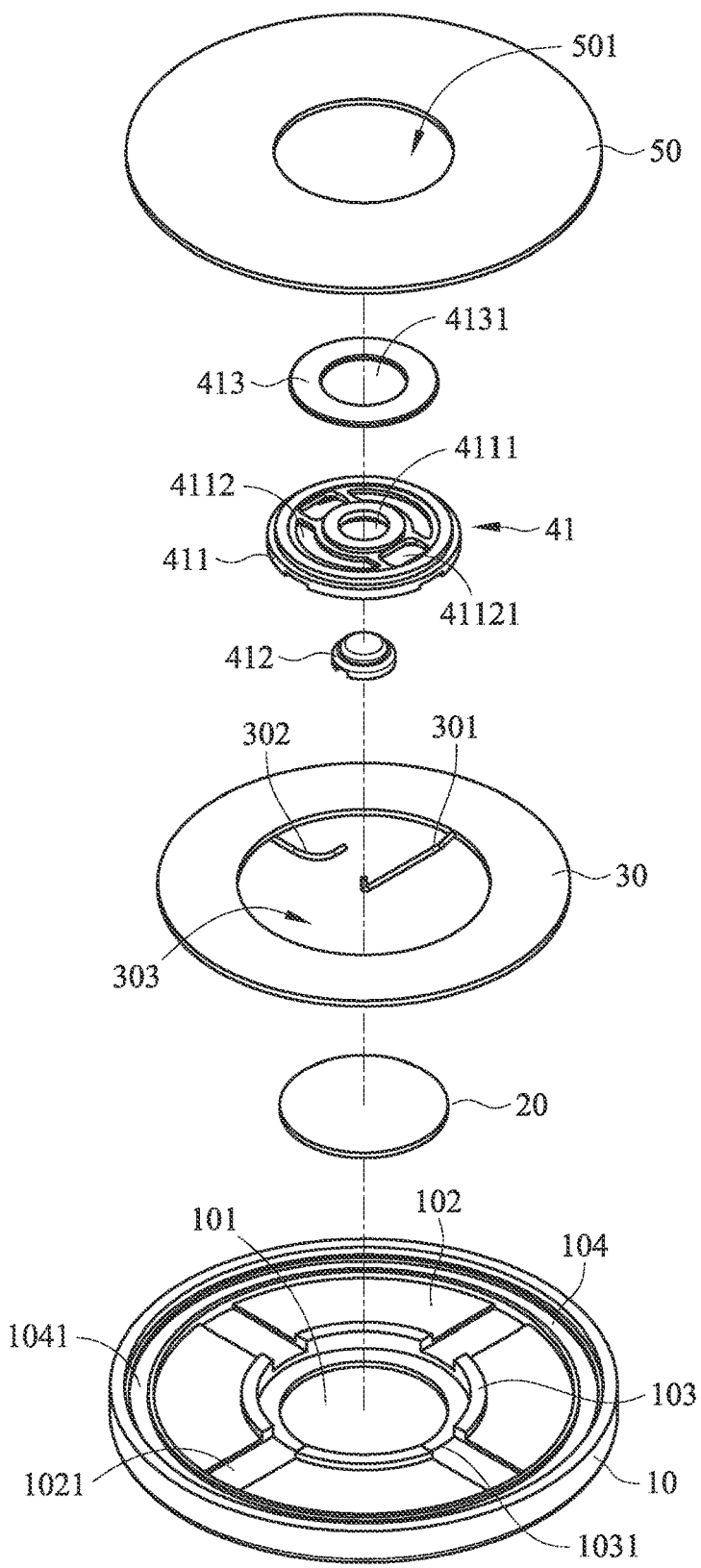
FIG. 3B is a schematic exploded view illustrating the universal wireless charging receiver according to the second embodiment of the present invention.
Figure 4:
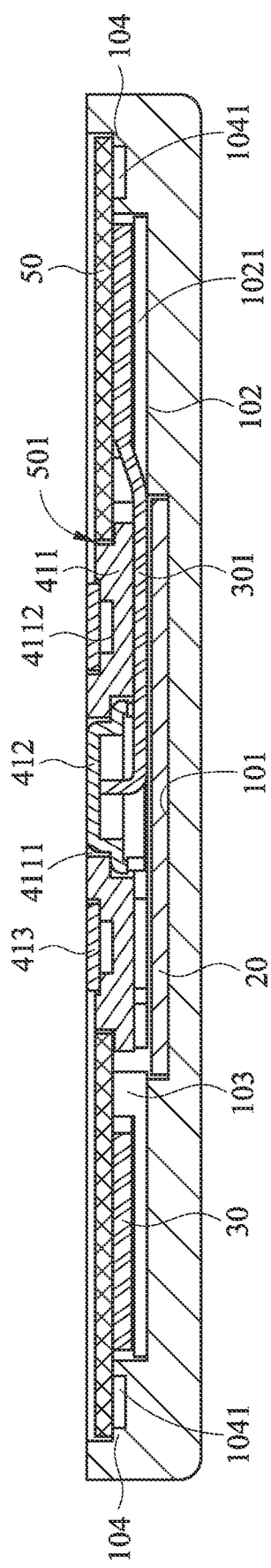
FIG. 4 is a schematic cross-sectional view illustrating the universal wireless charging receiver according to the second embodiment of the present invention.

Please refer to FIGS. 3A, 3B and 4. FIG. 3A is a schematic perspective view illustrating a universal wireless charging receiver according to a second embodiment of the present invention. FIG. 3B is a schematic exploded view illustrating the universal wireless charging receiver according to the second embodiment of the present invention. FIG. 4 is a schematic cross-sectional view illustrating the universal wireless charging receiver according to the second embodiment of the present invention. In this embodiment, the universal wireless charging receiver 1' comprises a base casing 10, a first magnetic shielding element 20, an induction coil 30, a power supply module 41 and a second magnetic shielding element 50. The functions of the base casing 10, the first magnetic shielding element 20, the induction coil 30 and the second magnetic shielding element 50 of this embodiment are identical to those of the first embodiment, and not redundantly described herein.

In comparison with the first embodiment, the structure of the power supply module 41 is distinguished. In this embodiment, the power supply module 41 is directly attached on or locked on the first magnetic shielding element 20. The power supply module 41 comprises a disc-shaped support structure 411, a first electrode 412 and a ring-shaped second electrode 413. The disc-shaped support structure 411 comprises a first perforation 4111 and a ring-shaped trench 4112. The first perforation 4111 runs through a middle region of the disc-shaped support structure 411. The ring-shaped trench 4112 is arranged around the first perforation 4111. Moreover, two second perforations 41121 are formed in the bottom of the ring-shaped trench 4112. The two second perforations 41121 are opposed to each other. The first electrode 412 is disposed within the first perforation 4111. The ring-shaped second electrode 413 has a hollow portion 4131. Moreover, the ring-shaped second electrode 413 is disposed within the ring-shaped trench 4112.

Please refer to FIG. 4 again. The first electrode 412 has a cap-shaped one-piece metal structure. Moreover, a position-limiting edge is protruded externally from a bottom periphery of the first electrode 412. The shape of the first perforation 4111 matches the cross-sectional shape of the first electrode 412. When the first electrode 412 is inserted into the first perforation 4111 from the bottom side of the disc-shaped support structure 411, the first electrode 412 is locked and fixed in the first perforation 4111 through the position-limiting edge. The ring-shaped second electrode 413 is adhered or locked in the ring-shaped trench 4112. The distal end of the first connection terminal 301 of the induction coil 30 is bent toward the first perforation 4111. Moreover, the distal end of the first connection terminal 301 is contacted with the bottom surface of the cap of the first electrode 412 through the first perforation 4111 (see FIG. 4). The distal end of the second connection terminal 302 is bent toward the second perforation 41121 (see FIG. 3B). Moreover, the distal end of the second connection terminal 302 is contacted with the bottom surface of the second electrode 413 through the second perforation 41121. Since disc-shaped support structure 411 of this embodiment is used to replace the rectifier circuit board 401 of the first embodiment, it is not necessary to retain an accommodation space to receive the electronic components. In other words, the thickness of the universal wireless charging receiver 1' is further reduced. On the other hand, the power supply module 41 does not have the rectifying function. When the induction coil 30 receives a magnetic field, the induction coil 30 generates an alternating current through an electromagnetic induction effect. The alternating current will be directly transferred to the connected electronic device through the first connection terminal 301, the second connection terminal 302, the first electrode 412 and the second electrode 413. Then, the received alternating current is converted into a direct current by the electronic device. The direct current can be used by the electronic device.

Figure 5:
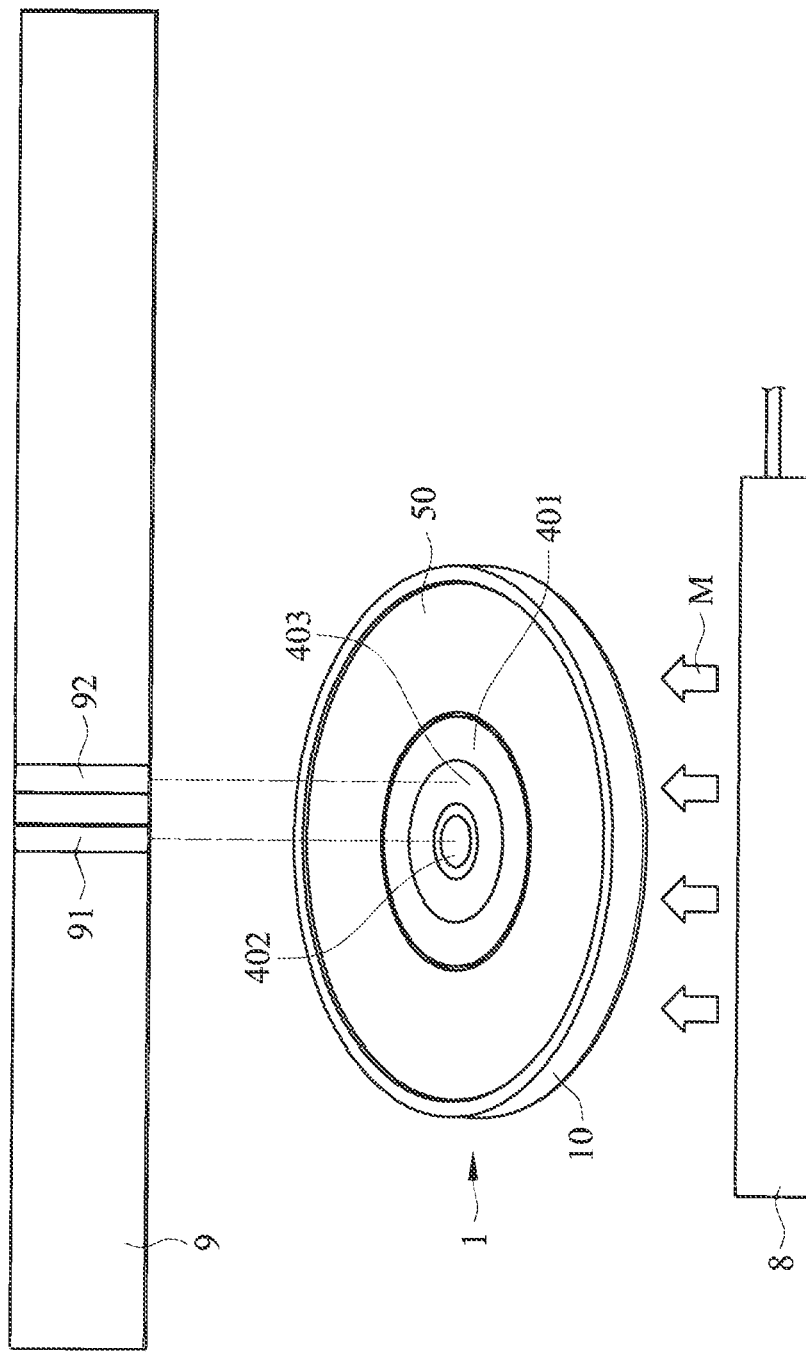
FIG. 5 schematically illustrating the operations of the universal wireless charging receiver of the present invention.

Please refer to FIGS. 1B and 5. FIG. 5 schematically illustrating the operations of the universal wireless charging receiver of the present invention. For illustration, the universal wireless charging receiver 1 of the first embodiment is taken as an example. Firstly, the power supply module 40 of the universal wireless charging receiver 1 faces an electronic device 9. Then, the first electrode 402 and the second electrode 403 of the universal wireless charging receiver 1 are connected with the Pogo pins 91 and 92 of the electronic device 9. For example, the electronic device 9 is a smart phone. According to the structural design of the present invention, a magnetic element (not shown) is accommodated within the ring-shaped accommodation groove 1041 (see FIGS. 1B and 3B). Consequently, the universal wireless charging receiver 1 can be temporarily fixed on the shell surface of the electronic device 9 in a magnetically attractable manner. In some other embodiments, the universal wireless charging receiver 1 is fixed on the shell surface of the electronic device 9 in a locking manner, an engaging manner or an attaching manner. Then, the universal wireless charging receiver 1 and the electronic device 9 are moved to a region over a charging transmitter 8 or placed on the charging transmitter 8. The charging transmitter 8 emits a magnetic field M to the universal wireless charging receiver 1. When the induction coil 30 of the universal wireless charging receiver 1 receives the magnetic field M, the induction coil 30 generates an alternating current through an electromagnetic induction effect. Then, the alternating current flows through the induction coil 30 and transfers to the rectifier circuit board 401 through the first connection terminal 301 and the second connection terminal 302. Then, the alternating current is converted into a direct current by the rectifier circuit board 401. The direct current is transferred to the electronic device through the first electrode 402, the second electrode 403 and the Pogo pins 91 and 92. After the charging operation on the electronic device 9 is completed, the universal wireless charging receiver 1 may be removed. In some embodiments, the universal wireless charging receiver 1 is directly installed on the electronic device 9, and thus the electronic device 9 additionally has the wireless charging function. In the above embodiment, the electronic device 9 is a smart phone. It is noted that the type of the electronic device 9 is not restricted. For example, the example of the electronic device 9 includes but is not limited to a notebook computer, a tablet computer, a game console, a wireless keyboard, a wireless mouse or a personal digital assistant.

Please refer to FIGS. 1B and 5 again. When the charging transmitter 8 emits the magnetic field M to the universal wireless charging receiver 1, the first magnetic shielding element 20 under the power supply module 40 can shield the magnetic force lines of the magnetic field M. Since the power supply module 40 is not influenced by the magnetic field M, the power supply module 40 will not generate an eddy current. Since the temperature increase effect caused by the eddy current is avoided, the loss of the metallic electronic components of the power supply module 40 will be reduced and the operating time and performance of the power supply module 40 will be enhanced. Moreover, since the induction coil 30 is covered by the second magnetic shielding element 50, the magnetic force lines of the magnetic field M can be formed as a closed loop. Consequently, the energy transfer efficiency of the magnetic field M is enhanced. In some embodiments, the universal wireless charging receiver 1 is not equipped with the second magnetic shielding element 50. On the other hand, the second magnetic shielding element 50 is replaced by a protective cover that has a locking mechanism, an engaging mechanism or an attaching mechanism. Consequently, the universal wireless charging receiver 1 can be mounted or installed on different kinds of electronic device 9. In other words, the applications of the universal wireless charging receiver 1 are increased.

When compared with the conventional technologies, the volume of the universal wireless charging receiver of the present invention is reduced. When the universal wireless charging receiver is mounted or installed on the electronic device, the flexibility is enhanced. Moreover, since the power supply module can be connected with various kinds of electronic devices, the applications are expanded. Moreover, the use of the magnetic shielding element can increase the use life and the energy transfer efficiency of the universal wireless charging receiver. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A universal wireless charging receiver for an electronic device, the universal wireless charging receiver receives magnetic field generated by a charging transmitter and provides electricity to the electronic device, wherein the electronic device has Pogo pins for receiving current from the universal wireless charging receiver, the universal wireless charging receiver comprising:
   a base casing comprising a recess and a concave structure, wherein the concave structure is arranged around the recess;
   a first magnetic shielding element disposed within the recess;
   a power supply module located over the first magnetic shielding element, the power supply module has a first electrode and a second electrode;
   a second magnetic shielding element, the second magnetic shielding element has a hollow portion corresponding to the power supply module and the first electrode and the second electrode of the power supply module are exposed to the hollow portion of the second magnetic shielding element so that the first electrode and the second electrode of the power supply module are connected with the Pogo pins of the electronic device through the hollow portion to provide electricity to the electronic device; and
   an induction coil disposed within the concave structure, and electrically connected with the power supply module,
   wherein a magnetic field is shielded by the first magnetic shielding element, so that an eddy current is not generated by the power supply module through the magnetic field.

2. The universal wireless charging receiver according to claim 1, wherein the base casing further comprises a ring-shaped wall between the recess and the concave structure, the concave structure has at least one wire groove, and the ring-shaped wall has at least one notch corresponding to the at least one wire groove.

3. The universal wireless charging receiver according to claim 2, wherein the induction coil comprises a first connection terminal and a second connection terminal, wherein the first connection terminal and the second connection terminal are disposed within the at least one wire groove, and the first connection terminal and the second connection terminal are penetrated through the at least one notch so as to be electrically connected with the power supply module.

4. The universal wireless charging receiver according to claim 2, wherein the base casing further comprises a protrusion edge, wherein the protrusion edge is arranged around the concave structure and has a stepped structure, and a bottom end of the protrusion edge is at a same level with a top end of the ring-shaped wall.

5. The universal wireless charging receiver according to claim 4, wherein a bottom surface of the second magnetic shielding element is contacted with the bottom end of the protrusion edge and the top end of the ring-shaped wall, the induction coil is covered by the second magnetic shielding element.

6. The universal wireless charging receiver according to claim 3, wherein the power supply module further comprises a rectifier circuit board, wherein the first electrode and the second electrode are electrically connected with the rectifier circuit board, and the first electrode and the second electrode are disposed on a top surface of the rectifier circuit board and connected with the electronic device.

7. The universal wireless charging receiver according to claim 3, wherein the power supply module further comprises a disc-shaped support structure, wherein the disc-shaped support structure comprises a first perforation and a ring-shaped trench, wherein the first perforation runs through a middle region of the disc-shaped support structure, the ring-shaped trench is arranged around the first perforation, at least one second perforation is formed in a bottom of the ring-shaped trench, the first electrode is disposed within the first perforation, and the second electrode is disposed within the ring-shaped trench.

8. The universal wireless charging receiver according to claim 7, wherein a distal end of the first connection terminal is bent toward the first perforation and contacted with the first electrode, wherein a distal end of the second connection terminal is bent toward the second perforation, penetrated through the second perforation and contacted with the second electrode.

\* \* \* \* \*